Nov. 23, 1965 J. J. McCARTHY 3,219,840

AUTOMATIC GAIN CONTROL CIRCUITS

Filed May 3, 1962

INVENTOR
J. J. Mc CARTHY

BY H. L. Logan
ATTORNEY

United States Patent Office 3,219,840
Patented Nov. 23, 1965

3,219,840
AUTOMATIC GAIN CONTROL CIRCUITS

James J. McCarthy, Succasunna, N.J., assignor to Bell Telephone Laboratories, Incorporated, New York, N.Y., a corporation of New York Filed May 3, 1962, Ser. No. 192,624
5 Claims. (Cl. 307—88.5)

Figure 1:
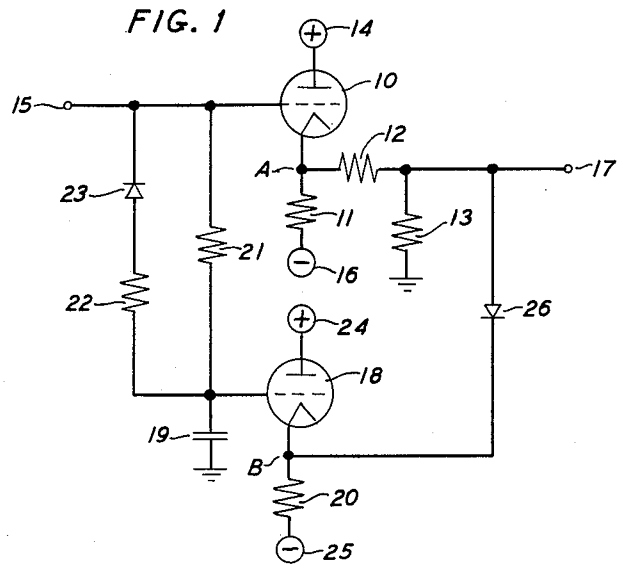

This invention relates to automatic gain control (AGC) circuits for radio receivers and in particular to such circuits which do not have similar response times for increases and decreases in the envelopes of received signals.

The use of automatic gain control circuits in receivers to compensate for variations in level of the carrier envelopes of received signals is well known. In general, the time constants of these circuits are made as short as possible without making them responsive to the instantaneous amplitudes of the carrier, intermediate or audio frequency signals within the receivers.

Although AGC circuits having such time constants are useful in many applications, they produce undesirable effects in other applications. One application in which they may produce undesirable effects is, for example, in missile guidance systems of the type where there is bidirectional communication between the missile and a ground control station. In such a guidance system, it sometimes occurs for one reason or another that the ground station momentarily does not receive signals from the missile during take-off. If the gain of the ground station receiver is permitted to increase to a maximum level during this momentary loss of signals, it is possible for the ground station, because of the orientation of its antenna and the range gating then in operation, to respond to echoes of its own transmitted signals from the surrounding terrain. In such an event, the ground station is of course receiving incorrect information and consequently commands the missile incorrectly. These incorrect commands may prove disastrous.

A study of the above-described problem indicated that the guidance of the missile is not affected to an intolerable extent if during the time of a momentary failure the ground station continues to issue commands based on information received prior to the time of failure. In view of this, it was considered highly desirable to control the ground station receiver so that its sensitivity during the time of a momentary loss of missile signals does not increase to the extent that the ground station responds to echoes of its own transmitted signals.

An object of the present invention is to control the sensitivity of a receiver so that when the level of the envelope of its input signal suddenly decreases in excess of a predetermined amount, the gain of the receiver is rapidly increased by a limited amount while additional gain is produced at a much slower rate.

This and other objects are attained in accordance with the invention by an AGC circuit which includes a relatively short time constant path and a relatively long time constant path. The short time constant path is operative to effect the gain control action except when the envelope amplitude of the signal to be controlled rapidly decreases with the change in amplitude exceeding a predetermined amount. Under such a condition, the short time constant path causes a rapid but limited increase in gain to occur after which the long time constant path becomes effective to control the gain. When the long time constant path becomes effective, the gain increases at a much slower rate. When the change in the envelope amplitude of the signal to be controlled persists sufficiently long for the change in gain to become stabilized, the total gain change produced is either that required for the amplitude change or the maximum change in gain capable of being produced. On the other hand, when the amplitude change is only of a momentary nature, the total gain change produced before the signal is recovered is neither that required by the amplitude change nor the maximum permitted by the receiver. This action prevents the gain from being increased to an undesirable level when a momentary loss of receiver input signal occurs.

In one of its broader aspects, the invention takes the form of an automatic gain control circuit that includes a first circuit having a relatively high output impedance and a relatively short time constant and a second circuit having a relatively low output impedance, a relatively long time constant to an input signal change in a first direction and a relatively short time constant to an input signal change in the opposite direction. The inputs to these circuits are connected to a common input while a unidirectional conductive device is connected between their outputs. The signal appearing at the junction of the first circuit and the unidirectional conductive device is used for gain controlling purposes. The poling of the device depends upon whether the signal applied to the common input increases or decreases when the envelope amplitude of the signal to be controlled decreases. The device is poled for easy current flow away from the second circuit when the signal applied to the common input decreases with decreases in the envelope amplitude while it is poled for easy current flow towards the second circuit when the signal applied to the common input increases with decreases in the envelope amplitude. In either case the device is reverse biased except for a period of time after the envelope amplitude rapidly decreases in excess of a predetermined amount. When the device is not reverse biased, the output of the first circuit is clamped to substantially that of the second circuit which causes the gain to be increased at a slower rate than would be otherwise produced by the first circuit.

In one embodiment of the invention, the circuit having a relatively high output impedance and a relatively short time constant comprises a cathode follower having a resistor dividing network connected to its output lead. The other circuit in this embodiment comprises a second cathode follower, a capacitor connected in shunt with the second cathode follower input, a first resistor connected between the cathode follower input and the common input and a series combination comprising a second resistor and a diode connected in parallel with the first resistor. The first resistor has a high resistance compared with that of the second resistor. The first resistor and the capacitor cause the second circuit to have a relatively long time constant for amplitude changes in one direction while the diode, the second resistor and the capacitor cause the circuit to have a relatively short time constant for amplitude changes in the opposite direction.

In still other embodiments of the invention, the first and second circuits comprise passive elements only.

Other objects and features of the invention will become apparent from a study of the following detailed description of several embodiments.

Figure 2:
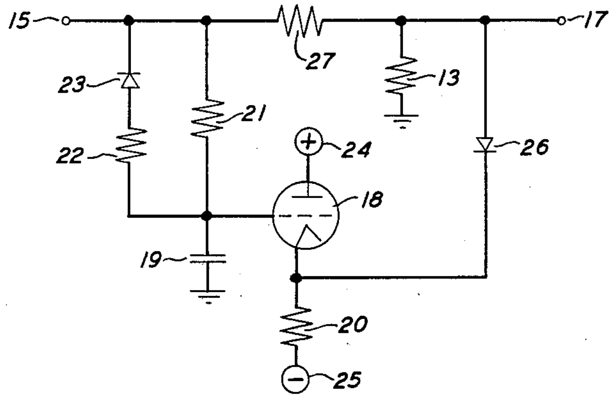
Figure 3:
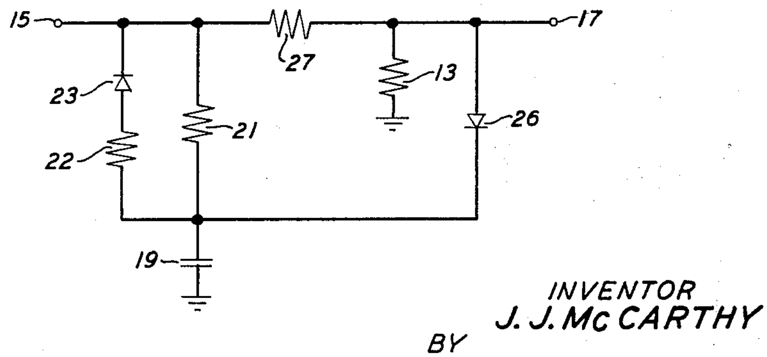

In the drawings:

FIGS. 1, 2 and 3 each illustrate an embodiment of the invention.

In the embodiment of FIG. 1, the circuit having a relatively short time constant and a relatively high output impedance comprises a tube 10 and resistors 11, 12 and 13. The plate electrode of tube 10 is connected to a positive terminal 14 of an unillustrated power supply while its grid electrode is connected to an input terminal 15. Resistor 11 is connected between the cathode electrode of tube 10 and a negative terminal 16 of an unillustrated power supply. Tube 10, resistor 11 and the unillustrated power supplies function as a conventional cathode follower. In order to increase the output impedance of this combination, resistor 12 is connected between the cathode electrode of tube 10 and an output terminal 17. Resistor 13 is connected between terminal 17 and ground. This circuit has a substantially zero time constant.

The circuit in this embodiment which has a relatively low output impedance, a relatively long time constant to an input signal change in a first direction and a relatively short time constant to an input signal change in the opposite direction, comprises a tube 18, a capacitor 19, resistors 20, 21 and 22 and a diode 23. The plate electrode of tube 18 is connected to a positive terminal 24 of an unillustrated power supply. Capacitor 19 is connected between the grid electrode of tube 18 and a point of ground potential while resistor 20 is connected between the cathode electrode of tube 18 and a negative terminal 25 of an unillustrated power supply. Tube 18, resistor 20 and the unillustrated power supplies connected thereto function as a conventional cathode follower. Resistor 21 is connected between the grid electrode of tube 18 and input terminal 15 while resistor 22 and diode 23 are connected in series between these two points. Diode 23 is poled for easy current flow towards terminal 15. Resistor 21 is relatively large compared with resistor 22 so that resistor 21 and capacitor 19 comprise a relatively long time constant circuit when diode 23 is reverse biased, while resistor 22 and capacitor 19 comprise a relatively short time constant circuit when diode 23 is forward biased.

A diode 26 is connected between the cathode electrode of tube 18 and output terminal 17. In this embodiment, diode 26 is poled for easy current flow towards tube 18 so that delayed changes in gain occur for rapidly increasing input signals applied to input terminal 15.

The remaining terminals of the unillustrated power supplies are connected to ground in the conventional manner.

The operation of the embodiment of FIG. 1 is now presented. To facilitate this explanation, the junction of the cathode electrode of tube 10, resistor 11 and resistor 12 is identified as point A while the junction of the cathode electrode of tube 18, resistor 20 and diode 26 is identified as point B. These points are so identified in FIG. 1.

Under quiescent conditions, the voltages at points A and B are substantially equal. Because of the voltage dividing action of resistors 12 and 13, diode 26 is reverse biased. The output of the cathode follower comprising tube 18 does not, therefore, affect the output at terminal 17.

When the input to terminal 15 suddenly increases (because of, for example, the loss of the receiver input signal), the voltage at point A increases proportionately because of the substantially zero time constant of this portion of the circuit. Furthermore, the voltage at terminal 17 begins to increase proportionately with the input applied to terminal 15. In accordance with a feature of the invention, the voltage at point B increases at a much slower rate because of the time constant introduced by resistor 21 and capacitor 19. The voltage at terminal 17 therefore increases more rapidly than that at point B until the voltage at terminal 17 sufficiently exceeds that at point B to forward bias diode 26. When diode 26 is forward biased, the potential at terminal 17 is clamped to slightly more than that appearing at point B because of the voltage drop across diode 26. As capacitor 19 continues to accumulate a charge, the voltages at point B and terminal 17 continue to increase. When the increase in the input applied to terminal 15 lasts sufficiently long for the charge on capacitor 19 to accumulate to the point where diode 26 is again reverse biased, the voltage at terminal 17 has reached a quiescent value, thereby calling for the maximum increase in gain possible for the input applied to terminal 15.

For slowly increasing inputs to terminal 15, the charging of capacitor 19 is rapid enough so that the voltage difference between terminal 17 and point B is not of a polarity to forward bias diode 26. The voltage at terminal 17 therefore changes proportionately with the input to terminal 15. In missile applications of the above-described type, this feature of the invention permits the gain of a receiver to be increased proportionately as the missile signals grow weaker because of the missile traveling away from the receiver.

When the input applied to input terminal 15 decreases, diode 26 remains back biased because the voltage at terminal 17 cannot exceed that at point B. The voltage at terminal 17 therefore changes proportionately with the input to terminal 15. Furthermore, in accordance with a feature of the invention, diode 23 becomes forward biased and, because resistor 22 has a relatively small value compared to that of resistor 21, the charge on capacitor 19 rapidly changes. This rapid recovery action enables the circuit to be ready for any subsequent increases in the input on terminal 15.

The case where a momentary loss of receiver input signal occurs so that the input to terminal 15 momentarily increases is now considered. When such a momentary loss occurs, diode 26 rapidly becomes forward biased, thereby clamping the voltage at terminal 17 to a level slightly in excess of that at point B. As a result of this action, only a portion of the gain called for by the input to terminal 15 is provided. Because the loss is only momentary, the input to terminal 15 reverts to substantially its initial level before the charge on capacitor 19 has changed to any great extent. The full gain called for by the input to terminal 15 is therefore prevented from occurring for momentary losses of receiver input signal. The action of diode 23 rapidly resets the charge on capacitor 19 so that the circuit is ready for any further changes in input.

FIG. 2 illustrates another embodiment of the invention. This embodiment is identical with that of FIG. 1 with the exception that the circuit having a relatively short time constant and a relatively high output impedance has been replaced by a resistor 27 connected between input terminal 15 and output terminal 17. The operation of this embodiment is substantially identical to that of the embodiment of FIG. 1.

Still another embodiment of the invention is shown in FIG. 3. This embodiment is identical to that of FIG. 2 with the exception that the remaining cathode follower has been eliminated. Care must be taken when using this embodiment to keep the output impedance of the lower portion of the embodiment below that of the upper portion. This may be difficult to achieve in some applications, thereby making it desirable to take advantage of the embodiments of FIGS. 1 and 2.

Although reference has been made several times to the use of the invention in missile guidance, it should be understood that the invention is not limited to this use. The invention is useful, for example, in any application where large gain increases because of momentary signal losses would be undesirable. Furthermore, it should be understood that although the invention has been illustrated and described through the use of several embodiments, various other embodiments may be devised by those skilled in the art without departing from the spirit and scope of the invention.

What is claimed is:

1. In combination a first transmission path having a relatively high output impedance and a relatively short time constant to input signal changes in both directions, a second transmission path having a relatively low output impedance, a relatively long time constant to input signal changes in only one direction and a unidirectional conductive means connected in series as part of said second transmission path prior to its output, and means connecting said first and second transmission paths in parallel.

2. In combination first circuit means having a relatively high output impedance and producing an output signal proportionately related to an input signal, second circuit means having a relatively low output impedance, a relatively high time constant to an input signal change in a first direction and a relatively low time constant to an input signal change in the opposite direction, means applying the same input signals to said first and second circuit means, unidirectional conductive means connected between the outputs of said first and second circuit means, and an output terminal connected to the junction of said first circuit means and said unidirectional conductive means.

3. An automatic gain control feedback path comprising first circuit means having a relatively high output impedance and a relatively short time constant to input signal changes in both directions, second circuit means having a relatively low output impedance, a relatively long time constant to an input signal change in a first direction and a relatively short time constant to an input signal change in the opposite direction, means applying the same input signals to said first and second circuit means, unidirectional conductive means connected between the outputs of said first and second circuit means and poled so as not to conduct when the potentials on said first and second circuit means outputs are produced by said input signal changes in said opposite direction, and an output terminal connected to the junction of said first circuit means and said unidirectional conductive means.

4. An automatic gain control feedback path in accordance with claim 3 in which said first circuit means produces an output which is a portion of said input signals, said second circuit means produces under quiescent conditions an output which is a greater portion of said input signals than that produced by said first circuit and has said relatively long time constant when said input signals are increasing in a positive direction, and said unidirectional conductive means comprises a diode pole for easy current flow from said first circuit means to said second circuit means.

5. An automatic gain control feedback path comprising an input terminal, an output terminal, a point of reference potential, a first resistor forming at least a portion of a transmission path between said input terminal and said output terminal, a second resistor forming at least a portion of a transmission path between said output terminal and said point of reference potential, the combination of said transmission path between said input terminal and said output terminal and said transmission path between said output terminal and said point of reference potential having a relatively short time constant, a third resistor, a capacitor, means connecting said third resistor and said capacitor in series between said input terminal and said point of reference potential with said capacitor connected to said point of reference potential, a fourth resistor having a relatively low resistance value with respect to the resistance value of said third resistor, a first diode, means connecting said fourth resistor and said first diode in series with respect to one another and the series combination thereof in parallel with said third resistor, and a second diode forming at least a portion of a transmission path between said output terminal and the junction of said third resistor and said capacitor, said diodes being oppositely poled with respect to the junction between said third resistor and said capacitor.

References Cited by the Examiner

UNITED STATES PATENTS

| | | | |
|---|---|---|---|
| 2,515,196 | 7/1950 | Coe | 328—173 X |
| 2,903,584 | 9/1959 | Jaffe et al. | 328—185 |
| 3,139,587 | 6/1964 | Peck | 307—88.5 |

JOHN W. HUCKERT, *Primary Examiner.*

DAVID J. GALVIN, GEORGE N. WESTBY, *Examiners.*